United States Patent
Watanabe (10) Patent No.: US 9,727,956 B2
(45) Date of Patent: Aug. 8, 2017

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,490

(22) Filed: Dec. 7, 2015

(65) Prior Publication Data
US 2016/0180506 A1 Jun. 23, 2016

(30) Foreign Application Priority Data
Dec. 19, 2014 (JP) ................. 2014-257052

(51) Int. Cl.
*G06T 5/00* (2006.01)
*G06T 5/10* (2006.01)

(52) U.S. Cl.
CPC ............... *G06T 5/003* (2013.01); *G06T 5/10* (2013.01); *G06T 2207/10024* (2013.01); *G06T 2207/20056* (2013.01)

(58) Field of Classification Search
CPC ............ G06T 5/10; G06T 2207/20056; G06T 2207/10024; G06T 5/003; G06T 1/0007; G06T 2207/20024
See application file for complete search history.

(56) References Cited

U.S. PATENT DOCUMENTS

| | | | | |
|---|---|---|---|---|
| 2002/0156821 A1* | 10/2002 | Caron | ........................ | G06T 5/10 708/315 |
| 2013/0114887 A1* | 5/2013 | Nanri | ...................... | G01C 3/085 382/154 |
| 2016/0005151 A1* | 1/2016 | Hatakeyama | ............. | G06T 5/20 348/241 |
| 2016/0027155 A1* | 1/2016 | Naruse | ................... | H04N 1/409 382/167 |

FOREIGN PATENT DOCUMENTS

JP   2013025473 A   2/2013

OTHER PUBLICATIONS

Richardson, "Bayesian-Based Iterative Method of Image Restoration", Journal of the Optical Society of America, vol. 62, No. 1, pp. 55-59, Jan. 1972.

* cited by examiner

*Primary Examiner* — Yon Couso
(74) *Attorney, Agent, or Firm* — Rossi, Kimms & McDowell LLP (57) ABSTRACT

An image processing apparatus includes an image acquirer configured to acquire an image, a function acquirer configured to acquire a plurality of optical transfer functions relating to an optical system, a function reviser configured to revise the plurality of optical transfer functions based on information relating to an image pickup element, a converter configured to convert the plurality of optical transfer functions revised by the function reviser into a plurality of point spread functions, and an image restorer configured to perform restoration processing on the image by using the plurality of point spread functions.

17 Claims, 4 Drawing Sheets

IMAGE PROCESSING APPARATUS, IMAGE PICKUP APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus which corrects a deterioration of an image caused by an optical system.

Description of the Related Art

For an object captured via an image pickup optical system, light emitted from one point cannot be converged to another point and has a minute spread due to an influence of a diffraction, an aberration, or the like that occurs in the image pickup optical system. Such a minutely-spread distribution is referred to as a PSF (point spread function). Due to the influence of the image pickup optical system, the captured image is formed with the PSF convolved with the image, and accordingly, the image is blurred and its resolution is deteriorated.

Recently, the captured image is typically stored as electronic data, and a method (image restoration processing) has been proposed which corrects an image deterioration caused by the image pickup optical system by performing image processing. The deterioration state of the image varies depending on a position in an image.

Japanese Patent Laid-open No. 2013-25473 discloses an image processing method for reducing a calculation amount while performing optimum restoration processing depending on a deterioration state at each position even when the deterioration of an image varies depending on a position in the image due to a characteristic of a lens. The literature "OSA VOLUME 62, NUMBER 1 Jan. 1972 Bayesian-Based Iterative Method of Image Restoration" discloses an image restoration method using so-called Lucy-Richardson method (LR method) based on Bayes' theorem.

However, in the image processing method disclosed in Japanese Patent Laid-open No. 2013-25473, the measured PSF is converted into each of vertical and horizontal dispersion values, and accordingly it cannot perform correction for asymmetric deterioration characteristics such as a large coma aberration in principle. The method of using the vertical and horizontal dispersion values of the PSF cannot be applied to a lens-interchangeable camera which has a number of combinations of an optical system and an image pickup element because a unit of a coordinate varies. Especially, in conventional methods of using a lens-interchangeable digital camera which has combinations of various lenses and image pickup elements, a shift-variant deterioration characteristic in a captured image cannot be satisfactorily restored.

SUMMARY OF THE INVENTION

The present invention provides an image processing apparatus, an image pickup apparatus, an image processing method, and a non-transitory computer-readable storage medium which are capable of satisfactorily restoring a deterioration of an image depending on an arbitrary combination of an optical system and an image pickup element.

An image processing apparatus as one aspect of the present invention includes an image acquirer configured to acquire an image, a function acquirer configured to acquire a plurality of optical transfer functions relating to an optical system, a function reviser configured to revise the plurality of optical transfer functions based on information relating to an image pickup element, a converter configured to convert the plurality of optical transfer functions revised by the function reviser into a plurality of point spread functions, and an image restorer configured to perform restoration processing on the image by using the plurality of point spread functions.

An image pickup apparatus as another aspect of the present invention includes an image pickup element configured to photoelectrically convert an optical image formed via an optical system to output an image signal, an image acquirer configured to acquire an image generated based on the image signal, a function acquirer configured to acquire a plurality of optical transfer functions relating to the optical system, a function reviser configured to revise the plurality of optical transfer functions based on information relating to the image pickup element, a converter configured to convert the plurality of optical transfer functions revised by the function reviser into a plurality of point spread functions, and an image restorer configured to perform restoration processing on the image by using the plurality of point spread functions.

An image processing method as another aspect of the present invention includes the steps of acquiring an image, acquiring a plurality of optical transfer functions relating to an optical system, revising the plurality of optical transfer functions based on information relating to an image pickup element, converting the plurality of optical transfer functions revised by the function reviser into a plurality of point spread functions, and performing restoration processing on the image by using the plurality of point spread functions.

A non-transitory computer-readable storage medium as another aspect of the present invention stores a program to cause a computer to execute a process including the steps of acquiring an image, acquiring a plurality of optical transfer functions relating to an optical system, revising the plurality of optical transfer functions based on information relating to an image pickup element, converting the plurality of optical transfer functions revised by the function reviser into a plurality of point spread functions, and performing restoration processing on the image by using the plurality of point spread functions.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First of all, an outline of an image processing method (image restoration processing) in this embodiment will be described. The following expression (1) is satisfied where, in a real space (x,y), f(x,y) is an image which is not deteriorated by an optical system, h(x,y) is a PSF (point spread function), and g(x,y) is a deteriorated image.

$$g(x,y)=\iint f(X,Y)*h(x-X,y-Y)dXdY \quad (1)$$

When the Fourier transform is performed for expression (1) to convert the real space (x,y) to a frequency space (u,v), the following expression (2) is satisfied.

$$G(u,v)=F(u,v)*H(u,v) \quad (2)$$

In expression (2), F(u,v), G(u,v), and H(u,v) are results of the Fourier transform of f(x,y), g(x,y), and h(x,y), respectively. Therefore, the following expression (3) is satisfied.

$$F(u,v)=G(u,v)/H(u,v) \quad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the inverse Fourier transform for F(u,v).

Actually, however, if such processing is performed to obtain the image which is not deteriorated, particularly when there is a value near zero on H(u,v), a value of 1/H(u,v) becomes significantly large. In order to solve this problem, using the Wiener filter W(u,v) represented by the following expression (4) is known.

$$W(u,v)=1/H(u,v)*|H(u,v)|^2/(|H(u,v)|^2+\Gamma) \quad (4)$$

In expression (4), symbol H(u,v) denotes an optical transfer function (OTF), and symbol Γ denotes a constant to avoid division by zero on the processing.

By multiplying expression (4) by the result G(u,v) of the Fourier transform of the deteriorated image g(x,y), the deterioration of the image caused by the optical system (image pickup optical system) and the image pickup element (sensor) can be corrected. In other words, frequency space information R(u,v) of the image restored by the image restoration processing using the Wiener filter W(u,v) is represented as the following expression (5).

$$R(u,v)=G(u,v)*W(u,v) \quad (5)$$

The problem of the Wiener filter occurs when a value of the optical transfer function H(u,v) in a frequency space is zero or an extremely small value (i.e., a value near zero). Even when the division by zero is avoided by adjusting a value of Γ in expression (4), the effect of the image restoration cannot be substantially obtained in the frequency region. The effect of the image restoration cannot be obtained but also a harmful effect such as ringing which is not actually preferable as an image and unnatural undershoot tends to occur.

As other methods of the image restoration processing, for example there is the Lucy-Richardson method (LR method). Different from using the Wiener filter, the image restoration processing by the LR method is not a method by the division of the optical transfer function as represented by expression (4). In particular, the LR method uses a method of Bayesian inference to perform the image restoration processing. Different from the image restoration processing using the Wiener filter, the LR method estimates lost frequency information to perform the image restoration processing. In other words, the division by zero only occurs in a region where all frequencies are zero in principle.

Accordingly, it can be an effective method which is robust compared with the Wiener filter in a region where some zero points occur in a frequency component or in a region where an extremely small value exists. On the other hand, it is necessary to perform calculation by repeat processing in a shift-invariant region, and the calculation cost is high. When a noise of the captured image is large, a harmful effect occurs due to a noise amplification similarly to the Wiener filter. The image restoration processing by using the LR method is represented by the following expression (6) in a real space.

$$f_n(x,y) \leftarrow f_{n-1}(x,y) \iint \frac{h(X-x,Y-y)g(X,Y)}{\iint h(X-s\ Y-t)f_{n-1}(s,t)dsdt} dXdY \quad (6)$$

In expression (6), symbol $f_n$ is an image which is updated (updated image) and symbol $f_{n-1}$ is an image before updating. Symbol h is a deterioration characteristic of the optical system, and for example it is a PSF. Symbol g is a deteriorated image.

In the image restoration processing by using the LR method, the image $f_{n-1}$ is sequentially updated until the processing is discontinued according to, for example, a predetermined evaluation criterion, and then the image $f_n$ is output. The evaluation criterion for the processing includes, for example, a difference value between the images $f_n$ and $f_{n-1}$. The image restoration processing may start with the setting of $f_0$=g as an initial value (when starting the LR method).

In order to apply the image restoration processing to an image captured by a digital camera, various measures are necessary. First, an image captured by using a typical digital camera has a deterioration characteristic which varies depending on a position in the image. Furthermore, in many cases, the image may be asymmetrically deteriorated in the periphery of the image because an aberration of an image pickup optical system is large. In addition, assuming an environment in which there are a number of combinations of the image pickup optical system and the image pickup element as in the case of the lens-interchangeable camera, a satisfactory result cannot be obtained only by applying expression (6).

In each of the following embodiments, a configuration and a method of satisfactorily restoring the deterioration of an image for arbitrary combinations of the optical system and the image pickup element will be described.

Embodiment 1

Figure 1:
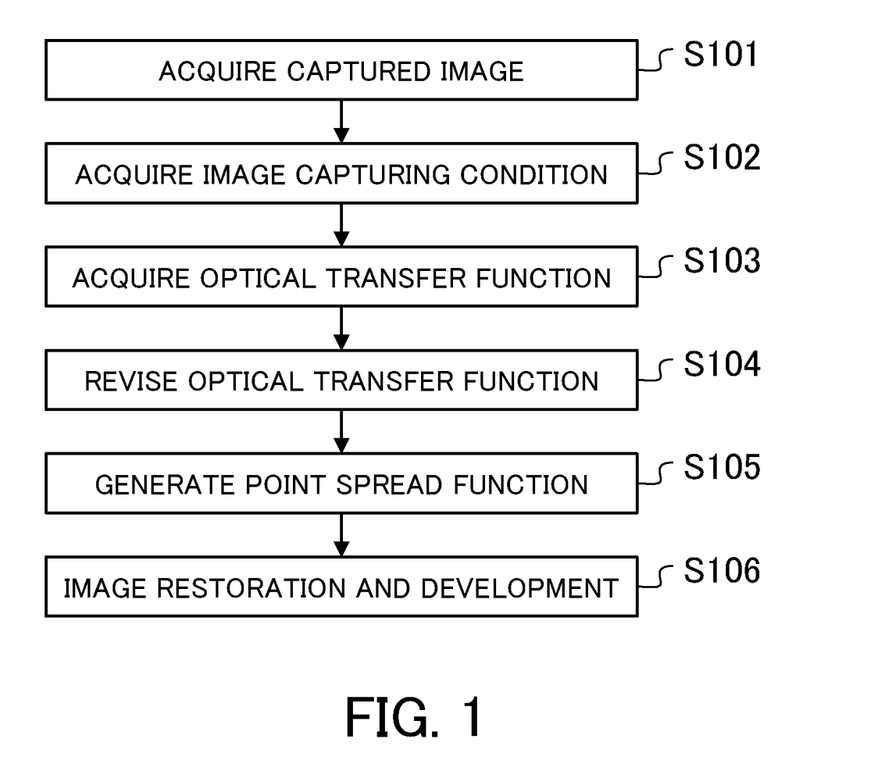
FIG. 1 is a flowchart of an image processing method in Embodiment 1.

First of all, referring to FIG. 1, an image processing method in Embodiment 1 of the present invention will be described. FIG. 1 is a flowchart of the image processing method in this embodiment. Each step in FIG. 1 is performed by each unit of an image processing apparatus.

First, at step S101, the image processing apparatus of this embodiment acquires an image (captured image) on which image restoration processing is to be performed. Subsequently, at step S102, the image processing apparatus acquires image capturing condition (image capturing condition information) to start the image restoration processing on the image acquired at step S101. In this embodiment, the image processing apparatus acquires the image capturing condition from information such as an Exif (Exchangeable image file format) added to the image acquired at step S101, or it directly acquires the image capturing condition. In this embodiment, the image capturing condition contains, as the image capturing condition of the optical system (image pickup optical system), a lens identification number (lens ID) to specify a lens used for capturing the image, a focal length at the time of capturing the image, an F number, and an object distance. The image processing apparatus can specify the optical transfer function of the optical system based on the image capturing condition which is a combination of the lens ID, the focal length, the F number, and the object distance.

As the image capturing condition, information indicating a situation at the time of capturing the image, such as information relating to an array of color filters and information relating to an optical low-pass filter, may be contained. The optical transfer function of the optical system is data discretized with a sampling pitch where a folding signal does not occur. It is preferred that the optical transfer function is for example calculated by simulation on a computer based on design data of a lens (optical system), or alternatively it may be measured by using an image pickup element having a small pixel pitch. It is preferred that the pixel pitch in this case is a pixel pitch where the folding signal does not occur as described above. When generating the optical transfer function of the optical system by using the computer simulation, it is preferred that the optical transfer function calculated, for each wavelength, by using a spectral characteristic of an assumed light source and a spectral characteristic of the color filter of the image pickup element is generated according to each of colors R, G, and B.

The number of the optical transfer functions of the optical system corresponds to the number of the combinations of the position on the image pickup element and mainly the spectral characteristic of the color filters of R, G, and B when the focal length, the F number, and the object distance are determined as described above. In other words, the plurality of optical transfer functions are necessary for each image capturing condition. For example, the number of the combinations of one-hundred (100) representative points on the image pickup element and the color filters of the three colors R, G, and B is 300. Accordingly, specifying the optical transfer functions of the optical system described above means specifying the 300 points.

Subsequently, at step S103, the image processing apparatus acquires the optical transfer function of the optical system based on the image capturing condition acquired at step S102. In this case, it is preferred that an acquisition range of the optical transfer function varies depending on a size of the image pickup element which is to be used. The acquisition range of the optical transfer function is for example determined based on a ratio of a range determined depending on the optical system and a range in which the image pickup element can acquire an optical image. The range determined depending on the optical system is for example a range in which an aberration correction is performed at the time of designing the optical system.

Subsequently, at step S104, the image processing apparatus revises (i.e., corrects) the optical transfer function acquired at step S103. The acquired optical transfer function of the optical system as it is cannot be applied to the image restoration processing. The image processing apparatus of this embodiment revises the optical transfer function of the optical system, with respect to various image pickup elements, depending on characteristics (frequency characteristics) of a band of each image pickup element and a shape of the pixel. In order to revise the optical transfer function of the optical system depending on the characteristics of the image pickup element, the following characteristics are considered.

First, as the characteristics of the image pickup element, there are information relating to a size of the image pickup element, a pixel pitch, an array of color filters, and the like. The size of the image pickup element is information which specifies an image circle to cut out an optical aerial image. The pixel pitch is information relating to a folding signal of the optical transfer function. In addition to the information described above, a characteristic of an optical low-pass filter may be considered. The characteristic of the optical low-pass filter is information relating to the presence or absence of the optical low-pass filter and information relating to a characteristic affected by the optical transfer function according to the optical low-pass filter. For example, the information contains information relating to a separation width, a separation direction, a separation method, and the like of the point spread function by the optical low-pass filter. When a single plate sensor is used, array information of the R, G, and B pixels can be used as information on the folding signal for a sampling interval of the Bayer array. When the image pickup element has the Bayer array, the sampling pitch of each of the R, G, and B pixels may be different from each other and the image pickup element may have a special arrangement. Accordingly, the information can be considered as well. The information can be acquired as the image capturing condition (image capturing condition information) at step S102.

The optical transfer function revised depending on the characteristics of the image pickup element at step S104 is represented by a model as the following expression (7).

$$H_s(u,v)=[H(u,v)\cdot OLPF(u,v)\cdot PIX(u,v)]_s \qquad (7)$$

In expression (7), symbol $H_s(u,v)$ is an optical transfer function revised depending on the characteristics of the image pickup element. Symbol $H(u,v)$ is an optical transfer function of the optical system, symbol $OLPF(u,v)$ is a frequency characteristic of the optical low-pass filter, and symbol $PIX(u,v)$ is a frequency characteristic depending on a pixel shape of the image pickup element. Symbol $[\ ]_s$ denotes acquisition of the frequency characteristic within a band of the image pickup element.

Subsequently, at step S105, the image processing apparatus performs a frequency conversion on each of the plurality of optical transfer functions revised at step S104 to convert them into data on a real space, and thus it generates point spread functions (PSFs) containing the characteristic of the image pickup element.

Subsequently, at step S106, the image processing apparatus performs the image restoration processing by using the PSF generated at step S105 and expression (6), and then it performs development processing on the restored image. With respect to expression (6), a deformation including various regularizations can be also adopted. In this case, the effect of the image restoration processing is enhanced with increasing the repeating number of times. However, a noise and the like are also amplified, and accordingly it is preferred that the processing, i.e., repeat processing, is finished based on a predetermined evaluation value. The predetermined evaluation value is for example RMSE (Root Mean Square Error) of $f_n$ and $f_{n-1}$ for each color in expression (6). By setting the predetermined evaluation value, the level of the effect can be expressed. The evaluation can be performed only in a specific region. It is preferred that the image processing method of this embodiment is provided as a program which operates by software or on a hard ware.

Embodiment 2

Figure 2:
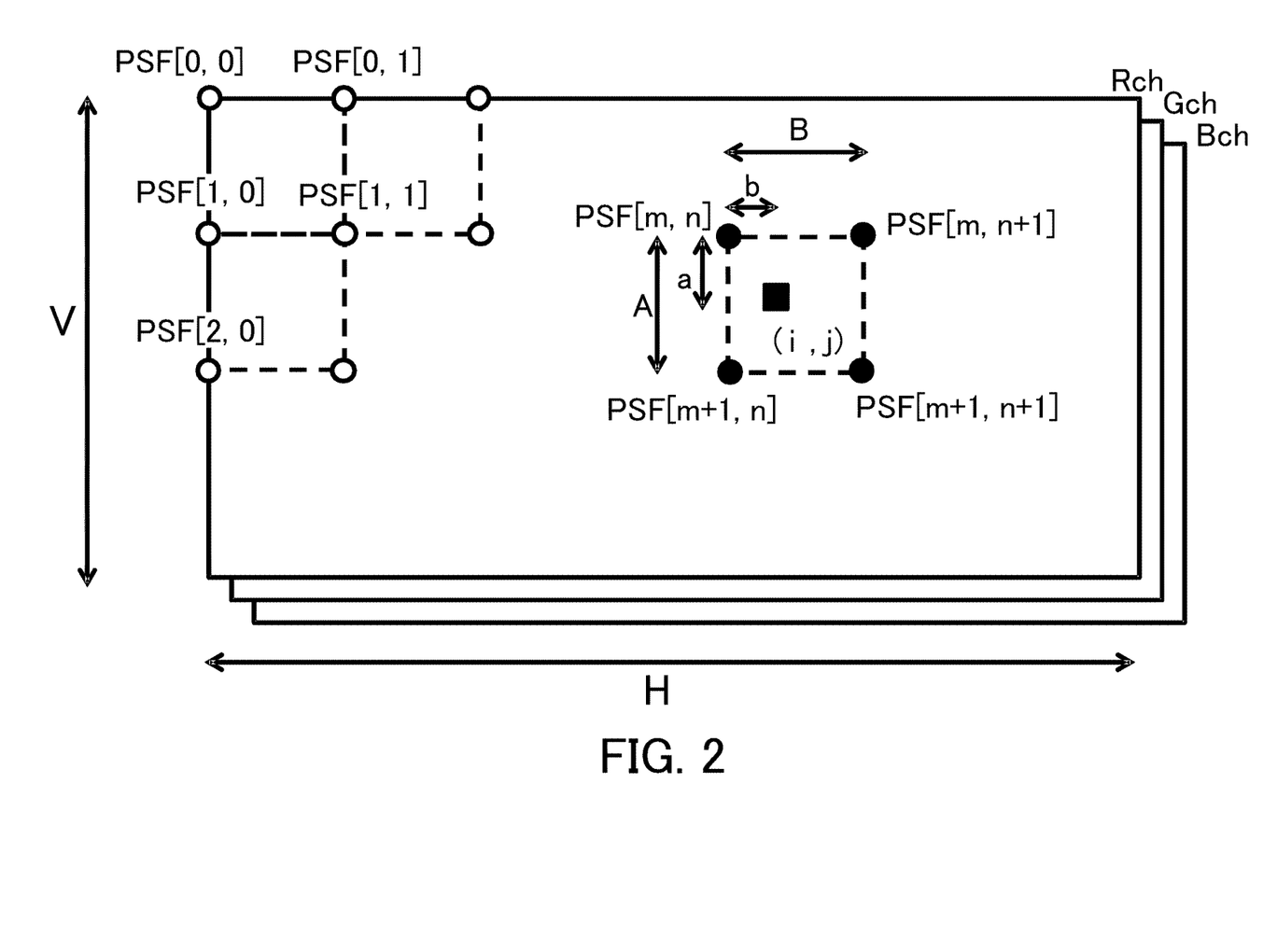
FIG. 2 is an explanatory diagram of an image processing method which corrects a shift-variant deterioration characteristic in Embodiment 2.

Next, referring to FIG. 2, Embodiment 2 of this embodiment will be described. FIG. 2 is an explanatory diagram of an image processing method which corrects a shift-variant deterioration characteristic, and it illustrates an example of image restoration processing using a PSF which varies depending on the characteristic of the image pickup element.

This embodiment will describe an image processing method in which a satisfactory result can be obtained in a case where a characteristic of the PSF significantly varies depending on a position in an image. When the PSF greatly changes depending on the position such as an image height in the image, ideally, the image processing is performed by using an appropriate (i.e., precise) PSF for each position in the image. However, storing data of the precise PSFs for all pixels of the image pickup element in a memory is not ideal. In this embodiment, with respect to each predetermined position in an image, an optical transfer function of the optical system corresponding to each position is revised (i.e., corrected) depending on the characteristic of the image pickup element. Then, the revised optical transfer function is converted into a PSF by frequency conversion to be used.

In this embodiment, the numbers of vertical and horizontal data of the R, G, and B of the image are denoted by V and H, respectively. When the R, G, and B are processed as the Bayer array, the numbers V and H may be different from each other. PSFs at M and N points are coordinated for the vertical and horizontal directions, respectively, and the respective intervals of the arrangement are defined as A and B, and a plurality of ((M−1)×(N−1)) rectangular regions are considered. It is preferred that A=V/(M−1) and B=H/(N−1) are satisfied for the purpose of calculation. In this case, by performing the integer division of i/A and j/B for each target pixel (i,j) to be processed, the rectangular region to which the PSF (target pixel) belongs among the plurality of rectangular regions can be calculated immediately without using processing such as conditional branching.

Accordingly, using m=i/A and n=j/B, four PSFs of PSF [m,n], PSF[m,n+1], PSF[m+1,n], and PSF[m+1,n+1] are selected. PSFij corresponding to the target pixel (i,j) can be calculated by using the selected four PSFs. Therefore, in this embodiment, a weight for each PSF is determined as follows.

$$W(m,n)=(A-a)*(B-b)/(A*B)$$

$$W(m,n+1)=(A-a)*b/(A*B)$$

$$W(m+1,n)=a*(B-b)/(A*B)$$

$$W(m+1,n+1)=a*b/(A*B)$$

In the above expressions, a=mod(i,A) and b=mod(j,B) are satisfied. Symbol mod(x,y) denotes a residue of x by y. As described above, the following expression (8) is obtained.

$$PSF_{ij}(x, y) = \\ W(m, n) \cdot PSF[m, n](x, y) + W(m, n + 1) \cdot PSF[m, n + 1](x, y) + \\ W(m + 1, n) \cdot PSF[m + 1, n](x, y) + \\ W(m + 1, n + 1) \cdot PSF[m + 1, n + 1](x, y) \quad (8)$$

Accordingly, in this embodiment, expression (6) is used as represented by the following expression (9) based on expression (8).

$$f_n(x, y) \leftarrow f_{n-1}(x, y) \sum_X \sum_Y \frac{PSF_{ij}(X - x, Y - y)g(X, Y)}{\sum_s \sum_t PSF_{ij}(X - s, Y - t)f_{n-1}(s, t)} \quad (9)$$

Processing by using expression (9) is performed for each of R, G, and B of the image to obtain a final image. In this embodiment, it is preferred that processing to match centroid positions of respective PSFs each other is performed in advance in order to perform the calculation of expression (8) with high accuracy by using small M and N. Maximum values can be matched each other, in addition to the centroid positions, and the PSFs can be corrected so that an evaluation value for evaluating both of them is satisfied.

Embodiment 3

Figure 3:
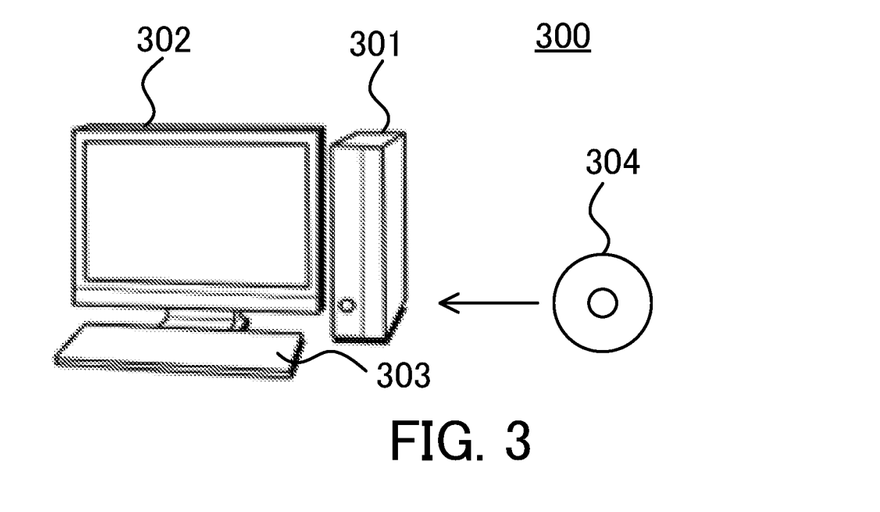
FIG. 3 is a configuration diagram of an image processing system in Embodiment 3.

Next, referring to FIG. 3, an image processing system (image processing apparatus) in Embodiment 3 of the present invention will be described. FIG. 3 is a configuration diagram of an image processing system 300 in this embodiment. The image processing system 300 includes an image processing apparatus 301 (hardware as an information processing apparatus), a display device 302 (monitor), and an input device 303 (input unit such as a keyboard). This embodiment will describe a case in which the image processing method of Embodiment 1 or 2 operates on the image processing system 300 (software in a personal computer).

First, in order to cause the image processing apparatus 301 to operate the image processing method of Embodiment 1 or 2, the software (image processing program) which executes the image processing method is installed in the image processing apparatus 301 (personal computer). The software can be installed from a medium 304 (storage medium) such as a CD-ROM or a DVD-ROM. Alternatively, the software may be installed through download via a network (internet). The image processing apparatus 301 stores a plurality of optical transfer functions (optical transfer function data) of the optical system (image pickup optical system). The plurality of optical transfer functions stored in the image processing apparatus 301 are for example all the optical transfer functions for each of various image capturing conditions (image capturing condition information) of the optical system. The optical transfer functions are downloaded via the medium 304 or the network to be stored in the image processing apparatus 301. In this embodiment, software (image processing program), optical transfer function data, and data such as image capturing condition information are stored in a storage such as a hard disk and a memory in the image processing apparatus 301. The image processing apparatus 301 can be configured to acquire at least part of data from an external server via the network.

The image processing apparatus 301 runs the installed software to perform the image restoration processing on the captured image. On the software, various settings (settings of parameters), such as the repeating number of times for determining the intensity of the image restoration processing and the application of the image restoration processing only in a predetermined region (region where the image restoration processing is to be performed) of an image, are possible. It is preferred that a user can change these parameters while confirming the restored image on the display device 302.

Embodiment 4

Figure 4:
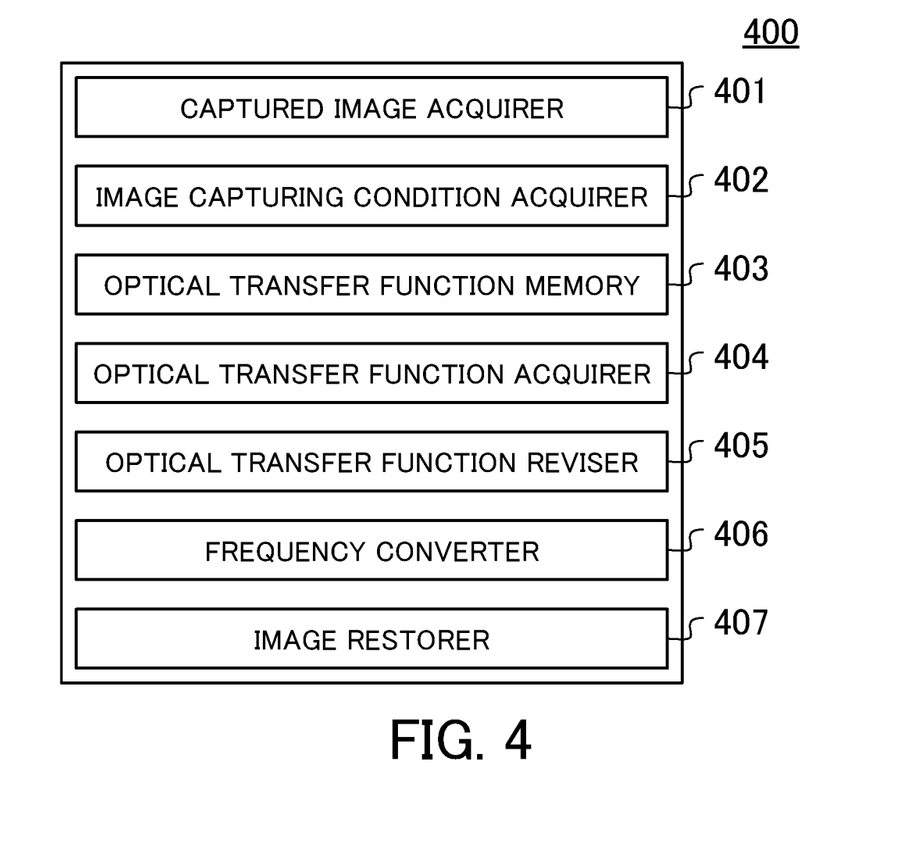
FIG. 4 is a block diagram of an image processing apparatus in Embodiment 4.

Next, referring to FIG. 4, an image processing apparatus in Embodiment 4 of the present invention will be described. FIG. 4 is a block diagram of an image processing apparatus 400 in this embodiment. As illustrated in FIG. 4, the image processing apparatus 400 includes a captured image acquirer 401, an image capturing condition acquirer 402, an optical transfer function memory 403, an optical transfer function acquirer 404, an optical transfer function reviser 405, a frequency converter 406, and an image restorer 407.

The captured image acquirer 401 (image acquirer) acquires an image (captured image) to which information relating to an image capturing condition (image capturing condition information) is added (step S101 in FIG. 1). The image capturing condition acquirer 402 (condition acquirer) acquires, as the image capturing condition, information relating an optical system (image pickup optical system) and information relating to an image pickup element (step S102 in FIG. 1). The information relating to the optical system contains information relating to a focal length, an F number, an object distance, or the like, but it is not limited thereto, and it may contain information relating to a diameter of an image circle of the optical system. The diameter of the image circle of the optical system is a radius or a diameter of a unit circle which is predetermined for correcting aberrations at the time of designing the optical system. The information relating to the image pickup element is information relating to a size of the image pickup element (image height), a pixel pitch of the image pickup element, a shape or a size of a pixel, or the like. In this embodiment, various elements (optical members) such as an optical low-pass filter may be provided in the image pickup element. In this case, information relating to characteristics of the various elements can be contained in the information relating to the image pickup element.

The optical transfer function memory 403 (memory) previously stores an optical transfer function (optical transfer function data) of the optical system. The optical transfer function acquirer 404 (function acquirer) acquires a plurality of optical transfer functions from the optical transfer function data stored in the optical transfer function memory 403 based on the information relating to the optical system acquired by the image capturing condition acquirer 402 (step S103 in FIG. 1). The optical transfer function reviser 405 (function reviser) revises, based on the information relating to the image pickup element, the plurality of optical transfer functions acquired based on the information relating to the optical system (step S104 in FIG. 1). This revision contains providing a characteristic of the optical low-pass filter or the pixel, or processing of conversion into an optical transfer function up to a frequency band according to the pixel pitch of the image pickup element.

The frequency converter 406 (converter) performs the inverse Fourier transform of all the optical transfer functions revised by the optical transfer function reviser 405, and it generates a point spread function (PSF) depending on characteristics of the optical system and the image pickup element (step S105 in FIG. 1). The image restorer 407 performs image restoration processing by us ing the image acquired by the captured image acquirer 401 and the point spread function generated by the frequency converter 406 (step S106 in FIG. 1).

The captured image acquirer 401 acquires the image (captured image), and the image capturing condition information may not be added to the captured image in some cases. Accordingly, in this embodiment, the image processing apparatus 400 can be configured such that the captured image and the image capturing condition are acquired separately. In this case, the image capturing condition acquirer 402 can acquire the image capturing condition information separately from the captured image (for example, via an image pickup optical system controller 506 or a state detector 507 of an image pickup apparatus 500 illustrated in FIG. 5).

Embodiment 5

Figure 5:
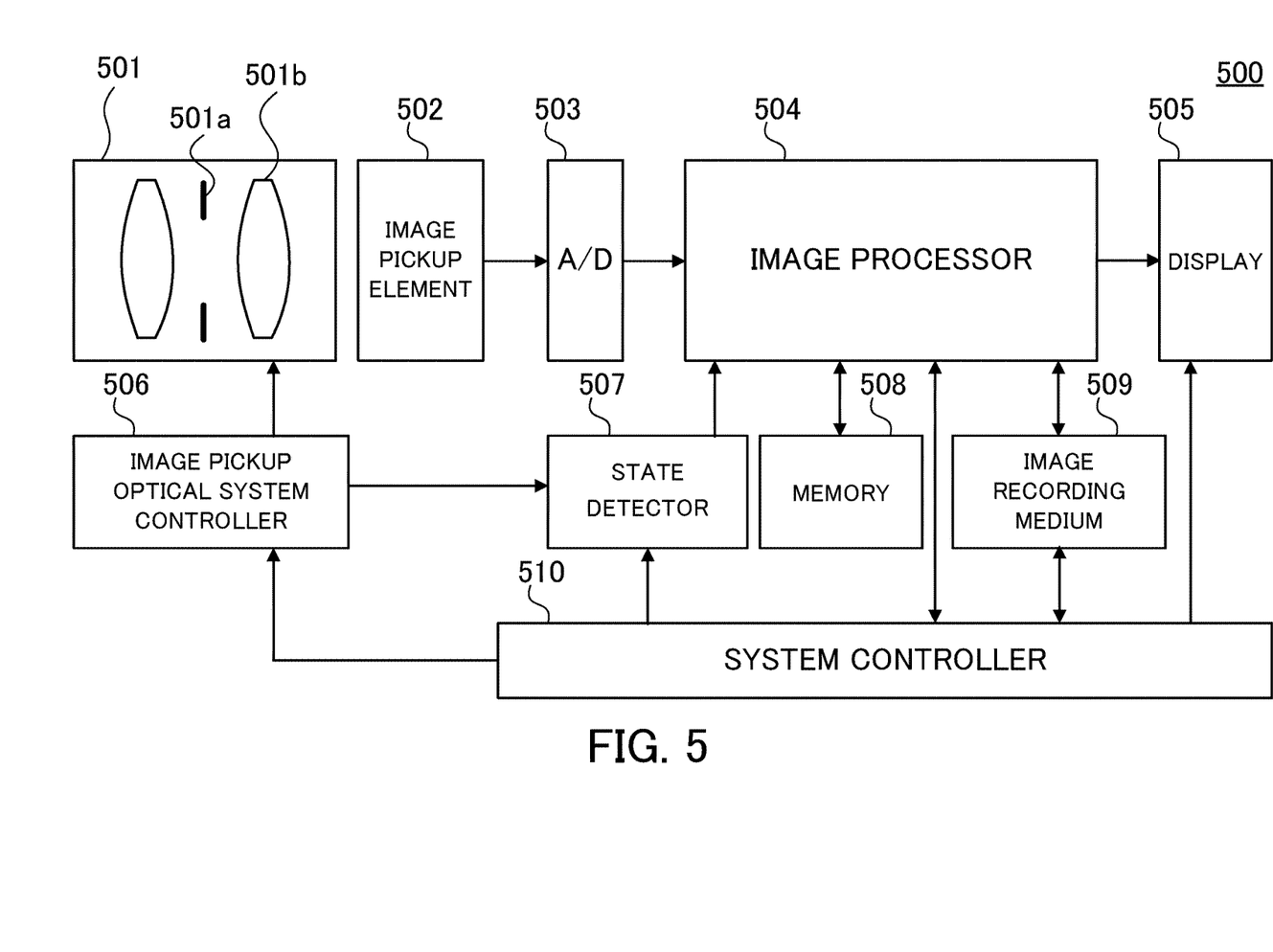
FIG. 5 is a block diagram of an image pickup apparatus in Embodiment 5.

Next, referring to FIG. 5, an image pickup apparatus in Embodiment 5 of the present invention will be described. FIG. 5 is a block diagram of an image pickup apparatus 500 in this embodiment. The image pickup apparatus 500 includes an image processor 504 (image processing apparatus) capable of performing the image processing method of each embodiment described above.

In the image pickup apparatus 500, an object (not illustrated) is imaged on an image pickup element 502 via an image pickup optical system 501 (optical system) including an aperture stop 501a (or light shielding member) and a focus lens 501b. In this embodiment, the image pickup optical system 501 is an interchangeable lens (lens apparatus) removably mounted on an image pickup apparatus body including the image pickup element 502. This embodiment, however, is not limited to this, and can be applied also to an image pickup apparatus including an image pickup apparatus body and an image pickup optical system 501 integrated with each other.

An aperture value (F number) is determined by the aperture stop 501a or the light shielding member. The image pickup element 502 photoelectrically converts an object image (optical image) formed via the image pickup optical system 501 to output an image signal (captured image data). An electric signal output from the image pickup element 502 is output to an A/D converter 503. The A/D converter 503 converts the electric signal (analog signal) input from the image pickup element 502 to a digital signal (captured image) and then outputs the digital signal to the image processor 504. The image pickup element 502 and the A/D converter 503 constitute an image pickup unit configured to photoelectrically convert the optical image (object image) formed via the image pickup optical system 501 to output the captured image.

The image processor 504 performs predetermined image processing on the digital signal output from the A/D converter 503, i.e., image generated based on the image signal output from the image pickup element 502, by using information of a state detector 507 and a memory 508. Especially, the image processor 504 of this embodiment performs image restoration processing on the captured image to output a corrected image (restored image). The image processor 504 includes units having the same functions as the captured image acquirer 401, the image capturing condition acquirer 402, the optical transfer function memory 403, the optical transfer function acquirer 404, the optical transfer function reviser 405, the frequency converter 406, and the image restorer 407.

The memory 508 (storage unit) stores an optical transfer function (optical transfer function data) of the image pickup optical system 501 for each image capturing condition (image capturing condition information), i.e., for each of combinations of a focal length at the time of capturing an image, an F number, an image capturing distance, and an image height. The memory 508 has the same function as the optical transfer function memory 403 illustrated in FIG. 4.

The image capturing condition is for example acquired by the image pickup optical controller 506 or the state detector 507. In this embodiment, the image processor 504 and the memory 508 constitute the image processing apparatus. In this embodiment, the optical transfer function memory can be included in the image processor 504, instead of the memory 508 provided outside the image processor 504.

The image processor 504 acquires the optical transfer function of the optical system corresponding to the acquired image capturing condition, and it revises the optical transfer function of the optical system by using the information relating to the image pickup element. Then, the image processor 504 reads the image data from the memory 508 to perform the image restoration processing. Various settings (settings of parameters), such as the repeating number of times for determining the intensity of the image restoration processing and the application of the image restoration processing only in a predetermined region (region where the image restoration processing is to be performed) of an image, are possible. It is preferred that a user can change these parameters while confirming the restored image on the display 505.

The output image (restored image) processed by the image processor 504 is recorded in an image recording medium 509 in a predetermined format. A display 505 displays an image obtained by performing predetermined processing for display on the processed image in this embodiment. Alternatively, the display 505 may display a simply-processed image for high-speed display. The display 505 also displays a GUI to select an image restoration mode or a normal image capturing mode by a user. When the image restoration mode is selected by the user via the GUI on the display 505, a system controller 510 controls the image processor 504 to perform the image processing method of Embodiment 1 or 2.

The system controller 510 includes a CPU, an MPU, or the like, and it controls a whole of the image pickup apparatus 500. More specifically, the system controller 510 controls each of the image processor 504, the display 505, the image pickup optical system controller 506, the state detector 507, and the image recording medium 509. The image pickup optical system controller 506 controls the motion of the image pickup optical system 501. The state detector 507 detects a state of the image pickup optical system 501 based on information of the image pickup optical system controller 506. In the image pickup apparatus 500, software (an image processing program) that realizes the image processing method described above can be supplied to the system controller 510 via a network or a storage medium, and then the system controller 510 can read out and execute the image processing program.

As described above, in each embodiment, an image processing apparatus includes an image acquirer (captured image acquirer 401), a function acquirer (optical transfer function acquirer 404), a function reviser (optical transfer function reviser 405), a converter (frequency converter 406), and an image restorer (image restorer 407). The image acquirer acquires an image (captured image). The function acquirer acquires a plurality of optical transfer functions relating to an optical system (image pickup optical system). The function reviser revises the plurality of optical transfer functions based on information relating to an image pickup element. The converter converts the plurality of optical transfer functions revised by the function reviser into a plurality of point spread functions. The image restorer performs restoration processing on the image by using the plurality of point spread functions.

Preferably, the image processing apparatus includes a condition acquirer (image capturing condition acquirer 402) which acquires image capturing condition information of the image. The function acquirer acquires the plurality of optical transfer functions based on the image capturing condition information. More preferably, the image processing apparatus includes a memory (optical transfer function memory 403) which stores optical transfer function data determined by using a design value or a measured value. The function acquirer acquires the plurality of optical transfer functions from the optical transfer function data. More preferably, the optical transfer function data are obtained by converting an optical transfer function calculated for each wavelength band into an optical transfer function for each color filter based on a spectral sensitivity characteristic of the color filter of the image pickup element and a spectral characteristic of a predetermined light source. The predetermined light source is a light source such as sunlight and a room light. The wavelength band is a wavelength band such as R (red), G (green), and B (blue).

Preferably, the function acquirer acquires the plurality of optical transfer functions different from each other depending on a pixel position (such as an image height) of the image pickup element based on information relating to the optical system. Preferably, the function acquirer changes an acquisition range of the plurality of optical transfer functions depending on a size of the image pickup element. Preferably, the information relating to the image pickup element contains information relating to a frequency characteristic of the image pickup element. More preferably, the information relating to the image pickup element contains information relating to a shape of each pixel of the image pickup element.

Preferably, the converter performs a frequency conversion of the revised optical transfer functions to generate the point spread functions. Preferably, the converter converts the revised optical transfer functions into the point spread functions for each pixel position of the image pickup element and for each type of the color filter of the image pickup element.

Preferably, the image restorer specifies a plurality of point spread functions for a plurality of points corresponding to a target pixel of the image pickup element from among the point spread functions converted by the converter, and it performs the restoration processing of the image for each target pixel. More preferably, the image restorer determines weight information (weight coefficient) to be applied to the plurality of point spread functions for the plurality of points, and it performs the restoration processing of the image for each target pixel based on the weight information. More preferably, the image restorer determines the weight information based on distance information between a position of the target pixel and positions of the plurality of points. For example, the image restorer increases the weight with decreasing the distance to perform the restoration processing on the image Preferably, the image restorer generates a first updated image by using the image (captured image) and the plurality of point spread functions. Then, the image restorer repeatedly performs processing of generating an (N+1)th updated image by using the image, an Nth updated image, and the plurality of point spread functions (N is a natural number). For example, the image restorer uses the LR method to perform the restoration processing on the image. The repeating number of times N of the processing can be set to a predetermined number of times K, or alternatively the image restorer may be configured so that it is determined that further processing needs to be repeated based on a degree of change between the Nth updated image and the (N+1)th updated image.

According to each embodiment, an image processing apparatus, an image pickup apparatus, an image processing method, and a non-transitory computer-readable storage medium which are capable of satisfactorily restoring a deterioration of an image depending on an arbitrary combination of an optical system and an image pickup element can be provided.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-257052, filed on Dec. 19, 2014, which is hereby incorporated by reference herein in its entirety.

What is claimed is:

1. An image processing apparatus comprising:
a memory; and
a processor configured to execute a program stored in the memory, the program including functions of an image acquirer, a function acquirer, a function reviser, a converter, and an image restorer, wherein:
the image acquirer is configured to acquire an image;
the function acquirer is configured to acquire a plurality of optical transfer functions relating to an optical system;
the function reviser is configured to revise the plurality of optical transfer functions based on information relating to an image pickup element;
the converter is configured to convert the plurality of optical transfer functions revised by the function reviser into a plurality of point spread functions; and
the image restorer is configured to generate a restored image by performing restoration processing on the image based at least on the plurality of point spread functions and to output the restored image.

2. The image processing apparatus according to claim 1, wherein the program further includes a function of a condition acquirer configured to acquire image capturing condition information of the image, and
wherein the function acquirer is configured to acquire the plurality of optical transfer functions based on the image capturing condition information.

3. The image processing apparatus according to claim 1, wherein the memory is configured to store optical transfer function data determined by using a design value or a measured value, and
wherein the function acquirer is configured to acquire the plurality of optical transfer functions from the optical transfer function data.

4. The image processing apparatus according to claim 3, wherein the optical transfer function data are obtained by converting an optical transfer function calculated for each wavelength band into an optical transfer function for each color filter based on a spectral sensitivity characteristic of the color filter of the image pickup element and a spectral characteristic of a predetermined light source.

5. The image processing apparatus according to claim 1, wherein the function acquirer is configured to acquire the plurality of optical transfer functions different from each other depending on a pixel position of the image pickup element based on information relating to the optical system.

6. The image processing apparatus according to claim 1, wherein the function acquirer is configured to change an acquisition range of the plurality of optical transfer functions depending on a size of the image pickup element.

7. The image processing apparatus according to claim 1, wherein the information relating to the image pickup element contains information relating to a frequency characteristic of the image pickup element.

8. The image processing apparatus according to claim 7, wherein the information relating to the image pickup element contains information relating to a shape of each pixel of the image pickup element.

9. The image processing apparatus according to claim 1, wherein the converter is configured to perform a frequency conversion of the revised optical transfer functions to generate the point spread functions.

10. The image processing apparatus according to claim 1, wherein the converter is configured to convert the revised optical transfer functions into the point spread functions for each pixel position of the image pickup element and for each type of the color filter of the image pickup element.

11. The image processing apparatus according to claim 1, wherein the image restorer is configured to:
specify a plurality of point spread functions for a plurality of points corresponding to a target pixel of the image pickup element from among the point spread functions converted by the converter, and
perform the restoration processing of the image for each target pixel.

12. The image processing apparatus according to claim 11, wherein the image restorer is configured to:
determine weight information to be applied to the plurality of point spread functions for the plurality of points, and
perform the restoration processing of the image for each target pixel based on the weight information.

13. The image processing apparatus according to claim 12, wherein the image restorer is configured to determine the weight information based on distance information between a position of the target pixel and positions of the plurality of points.

14. The image processing apparatus according to claim 1, wherein the image restorer is configured to:
generate a first updated image by using the image and the plurality of point spread functions, and
performs repeatedly processing of generating a (N+1)th updated image by using the image, an Nth updated image, and the plurality of point spread functions (N is a natural number).

15. An image pickup apparatus comprising:
an image pickup element configured to photoelectrically convert an optical image formed via an optical system to output an image signal;
a memory; and
a processor configured to execute a program stored in the memory, the program including functions of an image acquirer, a function acquirer, a function reviser, a converter, and an image restorer, wherein:
the image acquirer is configured to acquire an image generated based on the image signal;
the function acquirer is configured to acquire a plurality of optical transfer functions relating to the optical system;
the function reviser is configured to revise the plurality of optical transfer functions based on information relating to the image pickup element;
the converter is configured to convert the plurality of optical transfer functions revised by the function reviser into a plurality of point spread functions; and
the image restorer is configured to generate a restored image by performing restoration processing on the image based at least on the plurality of point spread functions and to output the restored image.

16. An image processing method comprising the steps of:
acquiring an image;
acquiring a plurality of optical transfer functions relating to an optical system;
revising the plurality of optical transfer functions based on information relating to an image pickup element;
converting the plurality of optical transfer functions revised by the function reviser into a plurality of point spread functions;
generating a restored image by performing restoration processing on the image based at least on the plurality of point spread functions, and
outputting the restored image.

17. A non-transitory computer-readable storage medium which stores a program to cause a computer to execute a process comprising the steps of:
acquiring an image;
acquiring a plurality of optical transfer functions relating to an optical system;
revising the plurality of optical transfer functions based on information relating to an image pickup element;
converting the plurality of optical transfer functions revised by the function reviser into a plurality of point spread functions;
generating a restored image by performing restoration processing on the image based at least on the plurality of point spread functions, and
outputting the restored image.

* * * * *